US011187271B2

(12) United States Patent
Sinhasan (10) Patent No.: US 11,187,271 B2
(45) Date of Patent: Nov. 30, 2021

(54) POLYMER JOINING RING FOR A BEARING ASSEMBLY

(71) Applicant: Aktiebolaget SKF, Gothenburg (SE)

(72) Inventor: Vijaykumar Rachappa Sinhasan, Bijapur (IN)

(73) Assignee: Aktiebolaget SKF, Gothenburg (SE)

(*) Notice: Subject to any disclaimer, the term of this patent is extended or adjusted under 35 U.S.C. 154(b) by 49 days.

(21) Appl. No.: 16/794,437

(22) Filed: Feb. 19, 2020

(65) Prior Publication Data
US 2021/0003175 A1    Jan. 7, 2021

(30) Foreign Application Priority Data

Jul. 4, 2019 (IN) .............................. 201941026774

(51) Int. Cl.
*F16C 19/38* (2006.01)
*F16C 33/58* (2006.01)
(Continued)

(52) U.S. Cl.
CPC ........ *F16C 33/7853* (2013.01); *F16C 19/386* (2013.01); *F16C 33/366* (2013.01);
(Continued)

(58) Field of Classification Search
CPC ........ F16C 19/18; F16C 19/386; F16C 19/38; F16C 33/366; F16C 33/581; F16C 33/586; F16C 33/60; F16C 33/62; F16C 33/7813; F16C 33/7816; F16C 3/7843; F16C 33/7853; F16C 43/04; F16C 2208/10;
(Continued)

(56) References Cited

U.S. PATENT DOCUMENTS 1,379,945 A * 5/1921 Teetsow .................. F16C 33/60
384/504
1,783,791 A * 12/1930 Hughes .................... F16C 43/04
29/898.063
(Continued)

FOREIGN PATENT DOCUMENTS

CN    203463491 U    3/2014
CN    110206818 A  * 9/2019  ............ F16C 33/581
(Continued)

*Primary Examiner* — Marcus Charles
(74) *Attorney, Agent, or Firm* — Garcia-Zamor Intellectual Property Law; Ruy Garcia-Zamor; Bryan Peckjian (57) ABSTRACT

The present disclosure discloses a polymer joining ring for a bearing assembly and is configured to retain a first inner ring and a second inner ring together to the bearing assembly. The polymer joining ring includes an outer surface and an inner surface. The outer surface includes a W or E shaped geometry throughout and includes a pair of flanges extending radially outwards at corners from outer surface, and a semi-circular protrusion extending at middle of the polymer joining ring. The pair of flanges are placed in tapered narrow grooves of the first inner ring and the second inner ring, and the semi-circular protrusion is placed in a triangular shape space produced between the first inner ring and the second inner ring can be tightly connected to each other. The joining ring is made of a polymer material that facilitates ease in assembling and accurate positioning of the inner rings.

18 Claims, 9 Drawing Sheets

(51) Int. Cl.
*F16C 33/36* (2006.01)
*F16C 43/04* (2006.01)
*F16C 33/60* (2006.01)
*F16C 33/78* (2006.01)

(52) U.S. Cl.
CPC ............ *F16C 33/586* (2013.01); *F16C 33/60* (2013.01); *F16C 43/04* (2013.01); *F16C 33/7816* (2013.01); *F16C 2208/10* (2013.01); *F16C 2208/20* (2013.01); *F16C 2226/70* (2013.01)

(58) Field of Classification Search
CPC .............. F16C 2208/20; F16C 2226/70; F16C 2326/02; F16C 33/7843
USPC ....... 384/486, 488, 499, 504, 506, 517, 559, 384/571, 585, 565
See application file for complete search history.

(56) References Cited

U.S. PATENT DOCUMENTS

| | | | | |
|---|---|---|---|---|
| 2,075,280 | A * | 3/1937 | Green | F16C 19/184 384/504 |
| 2,651,554 | A * | 9/1953 | Recknagel | F16C 33/60 384/504 |
| 4,749,288 | A * | 6/1988 | Tilch | F16C 19/386 384/584 |
| 4,783,182 | A * | 11/1988 | Caron | F16C 19/183 384/504 |
| 5,492,419 | A * | 2/1996 | Miller | F16C 19/386 384/551 |
| 5,641,239 | A * | 6/1997 | Michalek | F16C 33/60 384/499 |
| 8,202,007 | B2 * | 6/2012 | Abraham | F16C 25/06 384/504 |
| 8,360,653 | B2 | 1/2013 | Shaikh | |
| 10,514,059 | B2 * | 12/2019 | Takarabe | F16C 43/04 |
| 10,641,323 | B2 * | 5/2020 | Takarabe | F16C 43/04 |
| 2009/0123099 | A1 * | 5/2009 | Dickerhoff | F16C 35/063 384/459 |
| 2014/0363114 | A1 * | 12/2014 | Katsaros | F16C 33/4635 384/469 |

FOREIGN PATENT DOCUMENTS

| | | | | |
|---|---|---|---|---|
| CN | 111637155 A | * | 9/2020 | ............. F16C 33/60 |
| DE | 3724893 A | * | 2/1989 | ............. F16C 33/60 |
| DE | 102004033875 B4 | * | 4/2006 | ............. F16C 33/60 |
| DE | 102014200709 A1 | * | 7/2015 | ............. F16C 41/04 |
| DE | 102017113491 A1 | * | 12/2018 | ............. F16C 33/605 |
| DE | 102015218996 B4 | * | 4/2019 | ............. F16C 33/768 |
| EP | 3163105 A1 | * | 5/2017 | ............. F16C 33/60 |
| EP | 3314136 B1 | * | 7/2019 | ............. B61F 15/22 |
| FR | 2489905 A | * | 3/1982 | ............. F16C 19/386 |
| GB | 2288643 A | * | 10/1995 | ............. F16C 33/60 |
| JP | 02173418 A | * | 7/1990 | ............. G01P 3/443 |
| JP | H08105449 A | * | 4/1996 | ............. F16C 19/56 |
| JP | 2006312955 A | * | 11/2006 | ............. F16C 19/183 |
| JP | 2013133881 A | * | 7/2013 | ............. F16C 33/60 |
| JP | 2015016778 A | * | 1/2015 | ............. F16C 33/768 |
| JP | 2018002148 A | * | 1/2018 | ............. F16C 33/60 |

* cited by examiner

POLYMER JOINING RING FOR A BEARING ASSEMBLY

CROSS-REFERENCE TO RELATED APPLICATIONS

This application claims priority to Indian Patent Application no. 201941026774, filed Jul. 4, 2019, the contents of which is fully incorporated herein by reference.

FIELD OF THE INVENTION

The present disclosure relates to a polymer joining ring for joining two inner rings to a bearing assembly.

BACKGROUND OF THE INVENTION

A bearing is a mechanical component used for allowing rotational motion or linear motion to its moving elements. One example application of the bearing is in automobiles. In automobiles, the bearing is located between a wheel axle (moving element) and a wheel hub (stationary element).

Generally, two row unitized bearing assemblies include an outer ring, moving elements (like balls or rollers), a pair of inner rings, a pair of seals and a retainer. The outer ring has groove on its inside surface to form a pathway for the moving elements (balls/rollers). Similarly, the inner rings also have grooves on its outer surface to form pathways. The moving elements (balls/rollers) are placed in between the outer ring and the inner rings over the pathways. The seals are positioned along sides of the moving elements in between the outer ring and the inner rings. The retainer is a joining element used for joining/connecting the pair of inner rings together in the bearing assembly.

Often, metallic retainers are used for joining the inner rings of the bearing. The metallic retainer has manufacturing constraint towards achieving smaller corner radius for adequate fitment with sufficient contact area with inner rings. Further, the metallic retainers are expensive for manufacturing as well.

U.S. Pat. No. 8,360,653B2 describes double row angular contact ball bearing having split inner rings. Such bearing includes retaining tabs for holding the inner rings into the bearings. Wherein the retaining tabs are part of the comb cage which provide an axially inward and radially downward force onto the inner ring so as to hold the inner ring into the bearing. However, the construction of the comb cage with the retaining tabs increases the complexity in the manufacturing process.

CN patent 203463491U describes a novel double-row tapered roller bearing. Such bearing comprises an annular connecting piece with stopping grooves for connecting the rings. However, the annular connecting piece fails to create a flexible attachment to the inner rings.

Therefore, an improved retainer or joining element for joining the inner rings for the bearing assembly is needed, that does not increase the complexity in the manufacturing, easy to attach as well as is cost effective.

SUMMARY OF THE INVENTION

This summary is provided to introduce a selection of concepts in a simple manner that is further described in the detailed description of the disclosure. This summary is not intended to identify key or essential inventive concepts of the subject matter nor is it intended for determining the scope of the disclosure.

The polymer joining ring is configured to retain a first inner ring and a second inner ring together to the bearing assembly. The polymer joining ring includes an outer surface and an inner surface, wherein the outer surface includes a W or E shaped geometry throughout the surface. The W or E shaped geometry includes a pair of flanges extending radially outwards at corners from outer surface, and a semi-circular protrusion extending at middle of the polymer joining ring. The pair of flanges are placed in tapered narrow grooves of the first inner ring and the second inner ring, and the semi-circular protrusion is placed in a triangular shape space produced between the first inner ring and the second inner ring so as to the first inner ring and the second inner ring can be tightly connected to each other. The joining ring is made of a polymer material that facilitates ease in assembling and accurate positioning of the inner rings.

To further clarify advantages and features of the present disclosure, a more particular description of the disclosure will be rendered by reference to specific embodiments thereof, which is illustrated in the appended figures. It is to be appreciated that these figures depict only typical embodiments of the disclosure and are therefore not to be considered limiting of its scope. The disclosure will be described and explained with additional specificity and detail with the accompanying figures.

BRIEF DESCRIPTION OF THE DRAWINGS

The disclosure will be described and explained with additional specificity and detail with the accompanying figures in which.

Further, persons skilled in the art to which this disclosure belongs will appreciate that elements in the figures are illustrated for simplicity and may not have been necessarily drawn to scale. Furthermore, in terms of the construction of the joining ring and one or more components of the bearing assembly may have been represented in the figures by conventional symbols, and the figures may show only those specific details that are pertinent to understanding the embodiments of the present disclosure so as not to obscure the figures with details that will be readily apparent to those of ordinary skill in the art having benefit of the description herein.

DETAILED DESCRIPTION OF THE INVENTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

In the present disclosure, relational terms such as first and second, and the like, may be used to distinguish one entity from the other, without necessarily implying any actual relationship or order between such entities.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more elements or structures or components preceded by "comprises . . . a" does not, without more constraints, preclude the existence of other elements, other structures, other components, additional devices, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The components, methods, and examples provided herein are illustrative only and not intended to be limiting.

The present disclosure relates to a polymer joining ring. The polymer joining ring is configured to retain a first inner ring and a second inner ring together to the bearing assembly. The joining ring is made of a polymer material that facilitates ease in assembling and accurate positioning of the inner rings. In the following sections, inner rings have been used interchangeably in place of first inner ring and second inner ring. The polymer joining ring is manufactured by an injection molding manufacturing processes. In particular, the polymer joining ring helps in manufacturing process handling and transportation, and further supports one or more forces exerted during handling automatic and manual channel production systems. In additional, the polymer joining ring also supports acceleration loads associated with various modes of transportation.

Embodiments of the present disclosure will be described below in detail with reference to the accompanying figures.

Figure 1:
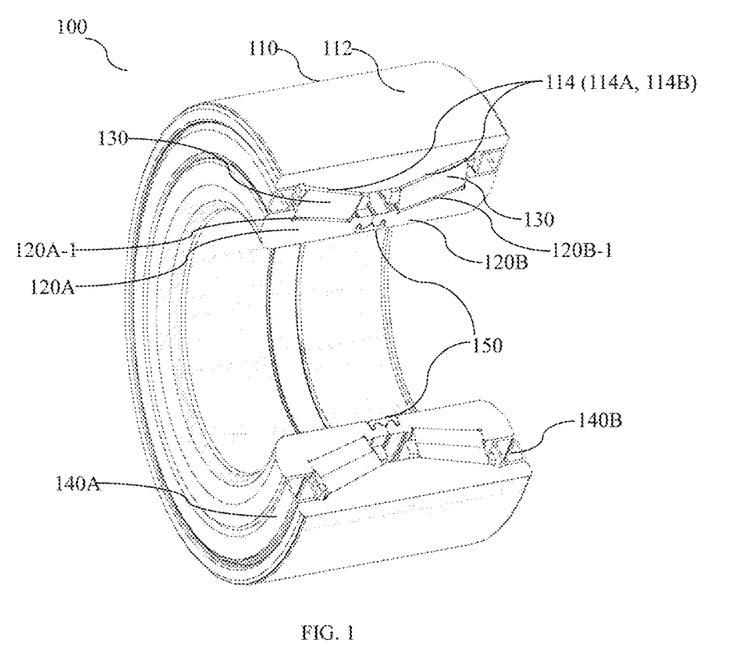
FIG. 1 illustrate a bearing assembly, in accordance with one embodiment of the present disclosure.

Referring to FIG. 1, a bearing assembly 100 comprises an annular outer ring 110 defining a hollow circular region inwardly, a pair of inner rings 120 (such as a first inner ring 120A and a second inner ring 120B) disposed axially adjacent to each other in the hollow circular region of the outer ring 110, a number of roller bodies 130 that roll between the rings 110 and 120. The roller bodies 130 may be of spherical, circular, oval, or tapered shape. The annular outer ring 110 includes a lateral surface 112 and a medial surface 114, wherein the lateral surface 112 includes a uniform surface throughout, and the medial surface 114 includes two inwardly facing tapered raceways (114A and 114B) therein. The first inner ring 120A and the second inner ring 120B are of symmetrical in design and having an outwardly facing tapered raceways (120A-1 and 120B-1) respectively, wherein the outwardly facing tapered raceways (120A-1 and 120B-1) serve as bearing races. The inwardly facing tapered raceways (114A and 114B) and the outwardly facing tapered raceway (120A-1 and 120B-1) together form a number of cavities to support the roller bodies 130 in rolling about axis to the bearing assembly 100. The numbers of cavities are formed in two annular rows between the rings (110 and 120). The numbers of roller bodies 130 are disposed in the cavities (having tapered raceways) formed between the annular outer ring 110 and the inner rings 120, one next to the other on the raceways, and wherein the roller bodies 130 are held at uniform distances with respect to one another by means of a bearing cage.

Further, the bearing assembly 100 comprises a pair of annular seals 140 (such as a first annular seal 140A and a second annular seal 140B) disposed axially spaced to each other and adjacent to the tapered raceways, respectively. For example, the first annular seal 140A is disposed adjacent to the first tapered raceway in between the outer ring 110 and the first inner ring 120A, whereas, the second annular seal 140B is disposed adjacent to the second tapered raceway in between the outer ring 110 and the second inner ring 120B. The bearing assembly 100 further comprises a polymer joining ring 150 for joining the first inner ring 120A and the second inner ring 120B to the bearing assembly 100.

Figure 2:
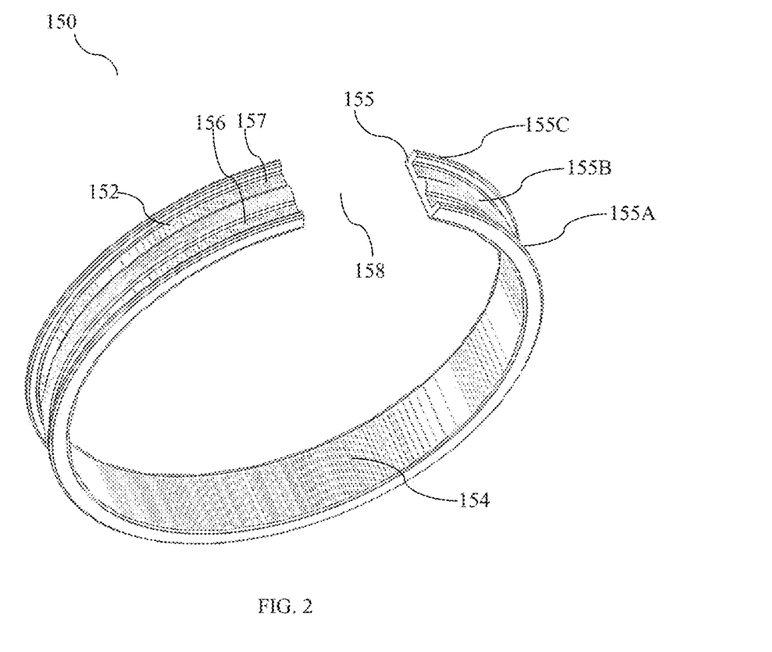
FIG. 2 illustrates a polymer joining ring, in accordance with one embodiment of the present disclosure.
Figure 3:
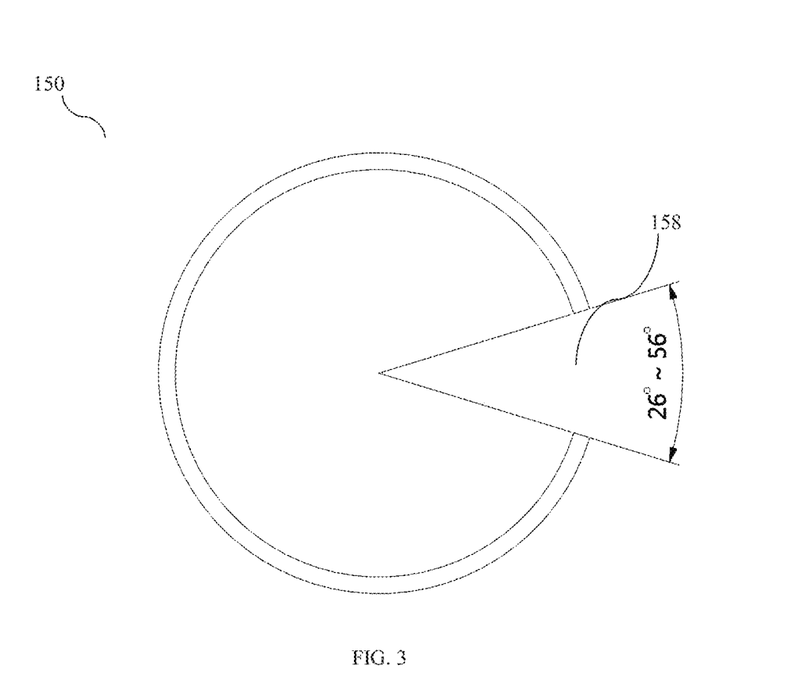
FIG. 3 illustrates a gap with an arc of the polymer joining ring, in accordance with one exemplary embodiment of the present disclosure.

Referring to FIG. 2, the polymer joining ring 150 includes an outer surface 152 having a W-shaped or E-shaped geometry 155 throughout the surface, wherein the W-shaped geometry 155 includes a pair of flanges (155A, 155C) extending radially outwards at corners from the outer surface 152, and a semi-circular protrusion 155B extending at middle of the polymer joining ring 150 to create two channels (156, 157). The two channels (156, 157) are extended annularly throughout the outer surface 152. The polymer joining ring 150 further includes an inner surface 154 having a uniform surface throughout. The polymer joining ring 150 is made of polymer materials or elastoplastic materials such as plastic, rubber, synthetic resin, etc. Further, the polymer joining ring 150 includes a gap 158 for allowing assembling of the polymer joining ring 150 into the bearing assembly 100. As shown in FIGS. 2 and 3, the polymer joining ring 150 is not 360-degree circular (not completely circular) due to the gap 158 of the polymer joining ring 150. The gap 158 includes an arc subtending an angle. For example, the angle may be in range of (26 degree-56 degree) to the gap 158 of the polymer joining ring 150 as depicted in FIG. 3.

Figure 4:
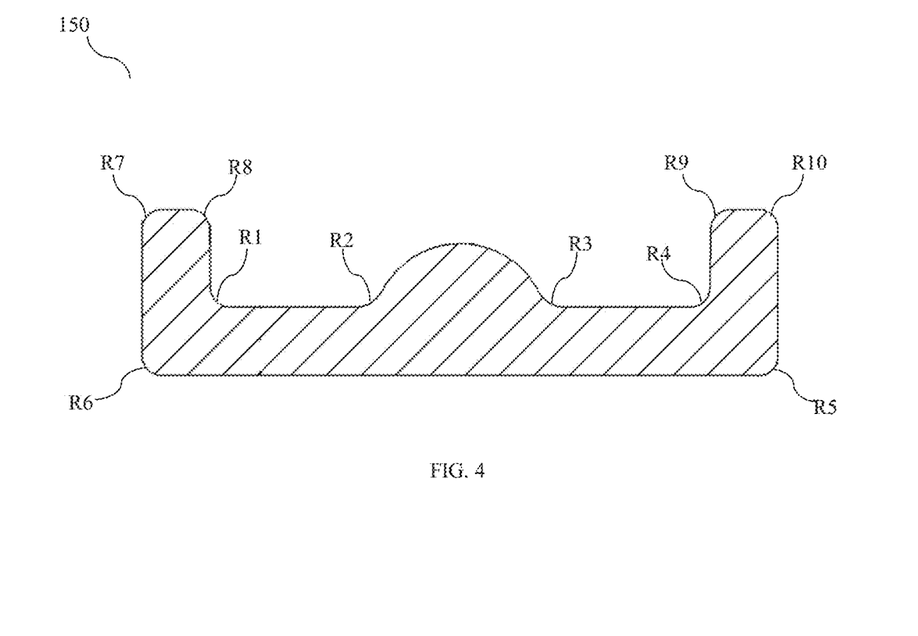
FIG. 4 illustrates a cross-sectional view of the polymer joining ring, in accordance with one exemplary embodiment of the present disclosure.

Referring to FIG. 4, a cross section of the polymer joining ring 150 is depicted. The polymer joining ring 150 which is manufactured by injection molding process helps in achieving a desired corner radius (R1, R2, R3, R4, R5, R5, R6, R7, R8, R9 and R10) for the polymer joining ring 150. The corner radius (R1, R2, R3, and R4) facilitate accurate placement of the first inner ring 120A and the second inner ring 120B with the polymer joining ring 150, whereas the corner radius (R7, R8, R9 and R10) facilitates easy assembly to the polymer joining ring 150 and the corner radius (R5 and R6) facilitate easy assembly with surrounding part. The length (L) of the pair of flanges (155A, 155C) is proportional to radius of the semi-circular protrusion 155B. The reduced length of the semi-circular protrusion 155B, therefore, increases the radial retention force produced in the first inner ring 120A and the second inner ring 120B to the bearing assembly 100.

Figure 5:
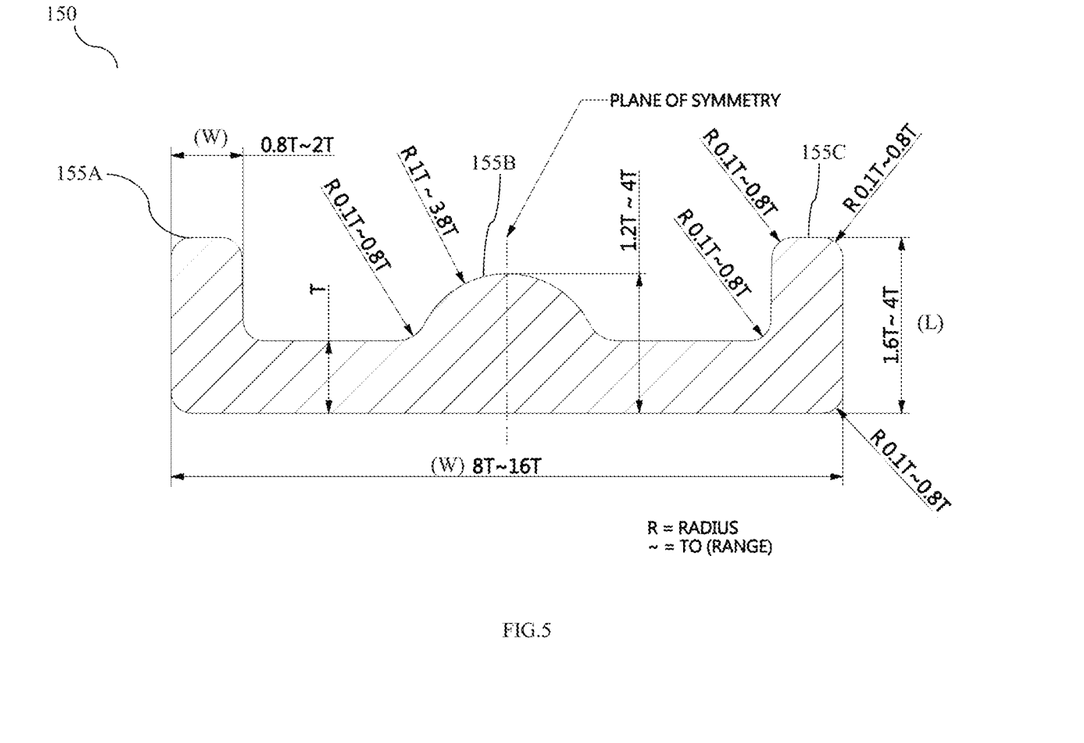
FIG. 5 illustrates the proportionate dimensions of the polymer joining ring, in accordance with one exemplary embodiment of the present disclosure.

Referring to FIG. 5 now, the proportionate dimensions of the polymer joining ring 150 is depicted. As shown in the figure, the corner radius (R1, R2, R3, R4, R5, R6, R7, R8, R9 and R10) are less than the thickness (T) of the polymer joining ring (150). The corner radius (R1, R2, R3, R4, R5, R6, R7, R8, R9 and R10) are constructed proportionate to the thickness (T) of the polymer joining ring (150) in range of, for example, (R0.1T~0.8T). The length (L) of the pair of flanges (155A, 155C) is proportional to the radius (R) of the semi-circular protrusion (155B). The length (L) of the pair of flanges (155A, 155C) is constructed proportionate to the thickness (T) in range of, for example (1.6T~4T), whereas the radius (R) of the semi-circular protrusion (155B) is constructed proportionate to the thickness (T), in range of, for example (R1T~3.8T). The width (W) of the polymer joining ring (150) is constructed in range of, for example (8T~16T), whereas the width (W) of pair of flanges (155A, 155C) are in range of, for example, (0.8T~2T).

Figure 6:
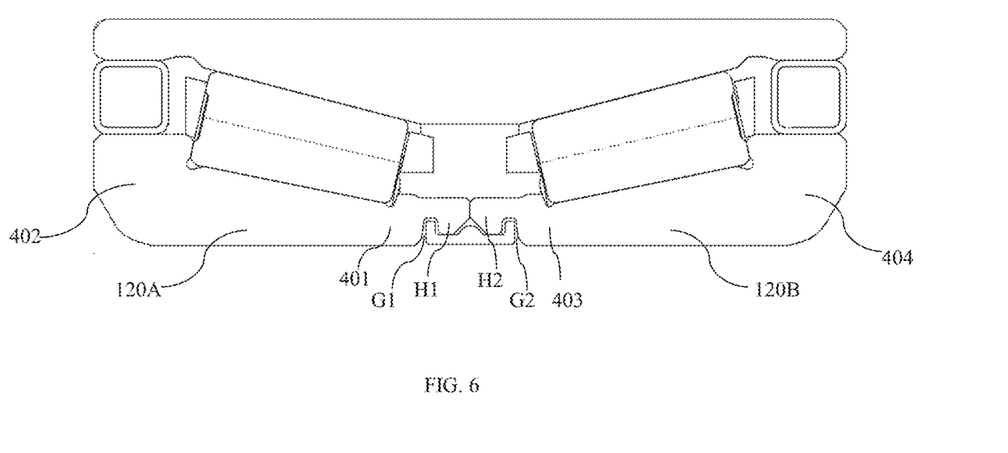
FIG. 6 illustrates a cross-sectional view of the bearing assembly, in accordance with one exemplary embodiment of the present disclosure.
Figure 7:
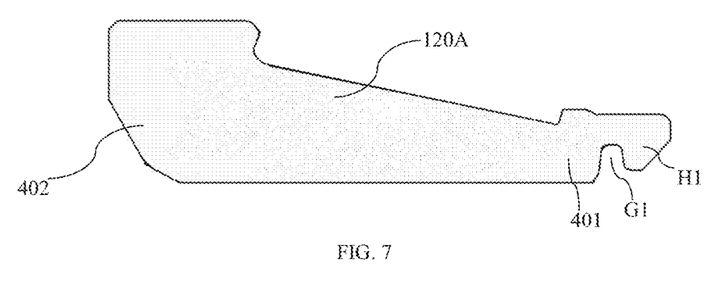
FIG. 7 illustrates a first inner ring of the bearing assembly, in accordance with one exemplary embodiment of the present disclosure.

Referring now to the bearing assembly illustrated in FIGS. 6 and 7, the first inner ring 120A and the second inner ring 120B, each, includes a proximal end (401, 403) and a distal end (402, 404), wherein the distal ends (402, 404), are larger in size as compared to the proximal ends (401, 403) of the first inner ring 120A and the second inner ring 120B. The first inner ring 120A and the second inner ring 120B include hook shaped profiles (H1 and H2) located at the proximal ends (401, 403) of the first inner ring 120A and the second inner ring 120B, respectively. Wherein, the hook shaped profiles (H1 and H2) include tapered narrow grooves (G1 and G2).

Figure 8:
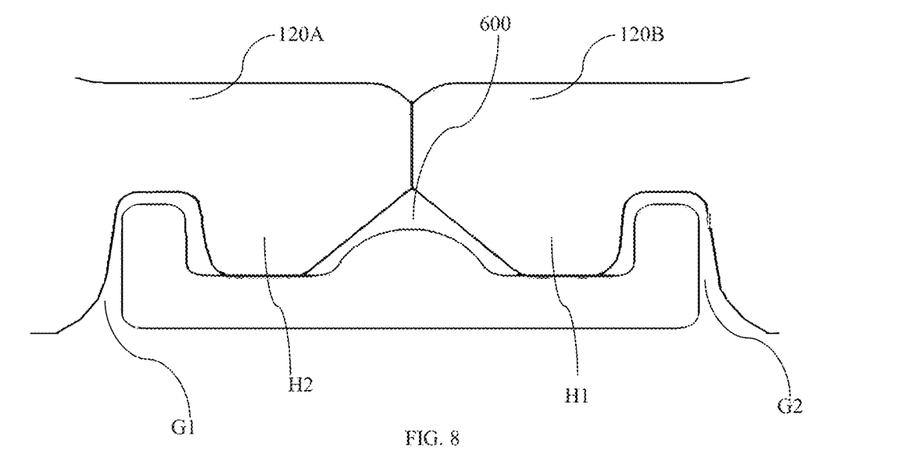
FIG. 8 illustrates the polymer joining ring attachment to the first inner ring and the second inner ring, in accordance with one exemplary embodiment of the present disclosure.

Referring to FIG. 8, it is to be noted that when the first inner ring 120A and the second inner ring 120B are disposed adjacent to each other in the bearing assembly, hook shaped profiles (H1 and H2) of the first inner ring 120A and the second inner ring 120B form a triangular shape space 600. In other words, the first inner ring 120A and the second inner ring 120B are allied to each other with their axially proximal end edges, when they are disposed adjacent to each other to the bearing assembly 100 so that they form the triangular shape space 600 in between.

In order to facilitate close engagement of the first inner ring 120A and the second inner ring 120B, the polymer joining ring 150 is positioned at just below the the first inner ring 120A and the second inner ring 120B in the bearing hollow circular region (as shown in FIG. 1). Therefore, the pair of flanges (155A, 155C) are placed and fitted tightly into the tapered narrow grooves (G1 and G2) of the first inner ring 120A and the second inner ring 120B, and, the semi-circular protrusion 155B is placed in the triangular shaped space 600 formed between the first inner ring 120A and the second inner ring 120B while disposed adjacent to each other in the bearing assembly 100. The semi-circular protrusion 155B increases axial retention capacity of the polymer joining ring 150 towards retaining the first inner ring 120A and the second inner ring 120B. In order to achieve tight attachment to the polymer joining ring 150 with the inner rings (120A and 120B), the flange 155A is placed into the tapered narrow grooves G1, so that the hook shaped profiles H1 of the first inner ring 120A is positioned along the channel 156 of the polymer joining ring 150, and the flange 155B is placed into the tapered narrow grooves G2, so that the hook shaped profiles H2 of the second inner ring 120B is positioned along the channel 157 of the polymer joining ring 150.

Figure 9:
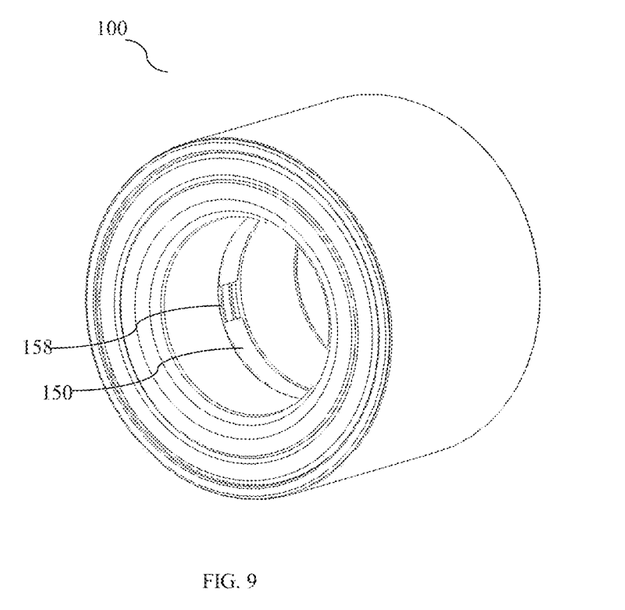
FIG. 9 illustrates the bearing assembly with the polymer joining ring, in accordance with one exemplary embodiment of the present disclosure.

FIG. 9 illustrates the bearing assembly 100 with the polymer joining ring 150, in accordance with one exemplary embodiment of the present disclosure. In FIG. 9, a perspective view portraying height, width, and depth of the bearing assembly 100 with the polymer joining ring 150 is illustrated.

The polymer joining ring disclosed herein provides flexible functionality for the bearing during manufacturing process, handling and transportation. The engagement to the flanges and the tapered narrow grooves prevents the first inner ring and the second inner ring from separating. The semi-circular protrusion positioned at the triangular space between the first inner ring and the second inner ring helps in increasing the radial retention force produced in the first inner ring and the second inner ring. The polymer ring is made of polymer materials, as a result, the overall manufacturing cost reduces compared to existing manufacturing methods. Furthermore, the polymer ring facilitates ease in assembling and accurate positioning of the inner rings and align accordingly.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

LIST OF REFERENCE NUMERALS

Bearing assembly 100
Annular outer ring 110
Pair of inner rings 120
First inner ring 120A
Second inner ring 120B
Roller bodies 130
Lateral surface 112
Medial surface 114
Tapered raceways (inwardly facing) (114A, 114B)
Tapered raceways (outwardly facing) (120A-1, 120B-1)
Pair of annular seals 140
First annular seal 140A
Second annular seal 140B
Polymer joining ring 150
Outer surface 152

Inner surface 154
W-shaped or E-shaped geometry 155
Pair of flanges (155A, 155C)
Semi-circular protrusion 155B
Channels (156, 157)
Gap 158
Corner radius (R1, R2, R3, R4, R5, R5, R6, R7, R8, R9 and R10)
Proximal end (401, 403)
Distal end (402, 404)
Grooves (G1, G2)
Hook shaped profiles (H1, H2)
Triangular shape space 600
Radius (R)
Thickness (T)
Width (W)

I claim:

1. A polymer joining ring for a bearing assembly, wherein the polymer joining ring joins a first inner ring and a second inner ring to the bearing assembly, the polymer joining ring comprising:
   a radial outer surface, which when viewed in axial cross-section, has a W-shaped or E-shaped geometry throughout the surface,
   the W-shaped or E-shaped geometry is formed, in part, by a pair of flanges extending radially outwards at corners from the outer radial surface, and a semi-circular protrusion extending at a middle of the polymer joining ring to create two channels;
   a radial inner surface having a uniform surface throughout;
   the two channels having a channel thickness as measured in a radial direction between the radial inner surface and the radial outer surface;
   the pair of flanges both having a flange thickness, as measured in a radial direction between the radial inner surface and the radial outer surface, which is in the range of one point six (1.6) times the channel thickness to four (4) times the channel thickness;
   the semi-circular protrusion having a maximum protrusion thickness, as measured in a radial direction between the radial inner surface and the radial outer surface, which is in the range of one point two (1.2) times the channel thickness to four (4) times the channel thickness;
   the polymer joining ring, when viewed in axial cross-section, having an axial ring width in the range of eight (8) times the channel thickness to twelve (12) times the channel thickness; and
   the pair of flanges, when viewed in axial cross-section, both having an axial flange width in the range of zero point eight (0.8) times the channel thickness to two (2) times the channel thickness.

2. The polymer joining ring as claimed in claim 1, wherein the polymer joining ring is manufactured by an injection molding manufacturing process.

3. The polymer joining ring as claimed in claim 2, wherein corner radius for the polymer joining ring are achieved via the injection molding manufacturing process.

4. The polymer joining ring as claimed in claim 3, wherein the corner radius are less than the thickness of the polymer joining ring.

5. The polymer joining ring as claimed in claim 3, wherein the corner radius of the polymer joining ring facilitates accurate placement of the first inner ring and the second inner ring with the polymer joining ring, and wherein the corner radius facilitates easy assembly to the polymer joining ring.

6. The polymer joining ring as claimed in claim 1, wherein the first inner ring and the second inner ring include tapered narrow grooves therein respectively.

7. The polymer joining ring as claimed in claim 1, wherein the pair of flanges are placed in tapered narrow grooves of the first inner ring and the second inner ring, and, the semi-circular protrusion is placed in a triangular shape space after assembly.

8. The polymer joining ring as claimed in claim 7, wherein the first inner ring and the second inner ring form the triangular shape space while the first inner ring and the second inner ring are positioned adjacent to each other in the bearing assembly.

9. The polymer joining ring as claimed in claim 7, wherein the semi-circular protrusion increases the radial retention force produced in the first inner ring and the second inner ring to the bearing, in assembled condition.

10. The polymer joining ring as claimed in claim 7, wherein the semi-circular protrusion increases axial retention capacity of the polymer joining ring towards retaining the first inner ring and the second inner ring.

11. The polymer joining ring as claimed in claim 1, wherein the length of the pair of flanges is proportional to radius of the semi-circular protrusion.

12. The polymer joining ring as claimed in claim 1, wherein proximal ends of the first inner ring and the second inner ring are positioned along the two channels.

13. A bearing assembly, comprising:
    a first inner ring and a second inner ring;
    a polymer joining ring located axially between the first inner ring and the second inner ring, the polymer joining ring comprising:
    a radial outer surface, which when viewed in axial cross-section, has a W-shaped or E-shaped geometry throughout the surface,
    the W-shaped or E-shaped geometry is formed, in part, by a pair of flanges extending radially outwards at corners from the outer radial surface, and a semi-circular protrusion extending at a middle of the polymer joining ring to create two channels;
    a radial inner surface;
    the polymer joining ring having first and second ring ends configured such that a circumferential gap is formed therebetween when the polymer joining ring is located between the first inner ring and the second inner ring, the gap and a bearing axis of rotation defining an angle in the range of twenty-six (26) degrees and fifty-six (56) degrees.

14. The bearing assembly of claim 13, wherein the two channels having a channel thickness as measured in a radial direction between the radial inner surface and the radial outer surface;
    the pair of flanges both having a flange thickness, as measured in a radial direction between the radial inner surface and the radial outer surface, which is in the range of one point six (1.6) times the channel thickness to four (4) times the channel thickness;
    the semi-circular protrusion having a maximum protrusion thickness, as measured in a radial direction between the radial inner surface and the radial outer surface, which is in the range of one point two (1.2) times the channel thickness to four (4) times the channel thickness;

the polymer joining ring, when viewed in axial cross-section, having an axial ring width in the range of eight (8) times the channel thickness to twelve (12) times the channel thickness; and the pair of flanges, when viewed in axial cross-section, both having an axial flange width in the range of zero point eight (0.8) times the channel thickness to two (2) times the channel thickness.

15. A bearing assembly, comprising:
a first inner ring and a second inner ring;
a polymer joining ring located to axially overlap a portion of the first inner ring and a portion of the second inner ring, the polymer joining ring comprising:
  a radial outer surface, which when viewed in axial cross-section, has a W-shaped or E-shaped geometry throughout the surface,
  the W-shaped or E-shaped geometry is formed, in part, by a pair of flanges extending radially outwards at corners from the outer radial surface, and a semi-circular protrusion extending at a middle of the polymer joining ring to create two channels;
  a radial inner surface; and
each of the first inner ring and the second inner ring, when viewed in axial cross-section, having a recess configured to receive one of the pair of flanges therein, the first inner ring and the second inner ring, when viewed in axial cross-section, being configured to form a triangular shaped recess to receive the semi-circular protrusion therein.

16. The bearing assembly of claim 15, wherein the polymer joining ring has first and second ring ends configured such that a circumferential gap is formed therebetween when the polymer joining ring is located between the first inner ring and the second inner ring, the gap and a bearing axis of rotation defining an angle in the range of twenty-six (26) degrees and fifty-six (56) degrees.

17. The bearing assembly of claim 16, wherein the two channels having a channel thickness as measured in a radial direction between the radial inner surface and the radial outer surface;
  the pair of flanges both having a flange thickness, as measured in a radial direction between the radial inner surface and the radial outer surface, which is in the range of one point six (1.6) times the channel thickness to four (4) times the channel thickness;
  the semi-circular protrusion having a maximum protrusion thickness, as measured in a radial direction between the radial inner surface and the radial outer surface, which is in the range of one point two (1.2) times the channel thickness to four (4) times the channel thickness;
  the polymer joining ring, when viewed in axial cross-section, having an axial ring width in the range of eight (8) times the channel thickness to twelve (12) times the channel thickness; and
  the pair of flanges, when viewed in axial cross-section, both having an axial flange width in the range of zero point eight (0.8) times the channel thickness to two (2) times the channel thickness.

18. The bearing assembly of claim 15, wherein the two channels having a channel thickness as measured in a radial direction between the radial inner surface and the radial outer surface;
  the pair of flanges both having a flange thickness, as measured in a radial direction between the radial inner surface and the radial outer surface, which is in the range of one point six (1.6) times the channel thickness to four (4) times the channel thickness;
  the semi-circular protrusion having a maximum protrusion thickness, as measured in a radial direction between the radial inner surface and the radial outer surface, which is in the range of one point two (1.2) times the channel thickness to four (4) times the channel thickness;
  the polymer joining ring, when viewed in axial cross-section, having an axial ring width in the range of eight (8) times the channel thickness to twelve (12) times the channel thickness; and
  the pair of flanges, when viewed in axial cross-section, both having an axial flange width in the range of zero point eight (0.8) times the channel thickness to two (2) times the channel thickness.

* * * * *